United States Patent Office 3,224,890
Patented Dec. 21, 1965

3,224,890
FIRE RESISTANT BITUMINOUS EMULSION
William E. Skelton, Groves, and Clarence E. Wilkinson, Port Neches, Tex., assignors to Texaco Inc., New York, N.Y., a corporation of Delaware
No Drawing. Filed Dec. 14, 1961, Ser. No. 159,445
5 Claims. (Cl. 106—15)

This invention is concerned with a novel fire resistant bituminous emulsion coating composition for protecting and preserving wooden structures, such as railway ties, scaffolding, bridge timbers, utility poles and particularly those wooden structures in enclosed surroundings such as mines, subways and tunnels. In addition, the invention also relates to wooden structures coated with the bituminous emulsion.

In the past asphaltic compositions have been often employed as fire resistant coatings as well as insect and moisture protective coatings for wooden structures. Many of these asphaltic compositions although suitable and satisfactory for outdoor use were not suitable for application in enclosed areas in that they were cut back with a combustible diluent such as light hydrocarbon distillate. Although bituminous coatings cut back with combustible diluent can provide fire resistant coatings once cured, during their application and curing in enclosed areas, the fumes of the evaporating diluent present a hazardous condition from the aspect of fire, explosion and toxicity.

We have discovered and this constitutes the invention, an aqueous asphaltic emulsion comprising asphalt, water, alkali metal salt of Vinsol resin, alkali metal hydroxide, asbestos fiber, pulverized oyster shell or mica, alkali metal carboxy alkyl cellulose and an ammonium phosphate. The emulsion has outstanding fire resistant properties before, during, as well as after curing and does not present a fire, explosion or toxicity hazard when applied in enclosed surroundings. In addition, we have found that the emulsion is of low cost, readily penetrates wood fiber, strongly adheres to wood fibers even at relatively high temperatures, and upon curing resists moisture, blistering and cracking, and has a consistency which allows application by brushing, troweling or spraying at moderate atmospheric temperatures without substantial sagging of the resultant coating. These outstanding properties are the result of the interaction of the individual ingredients in the emulsion. Further, the phosphate and cellulose components of the emulsion appear to function in a synergistic-like manner in imparting fire resistance to the bituminous emulsion. This is quite surprising since cellulose materials are often placed in the combustible category, however, under the conditions of the invention they promote fire resistance.

Advantageously, the coating composition comprises between about 15 and 20 wt. percent asphalt, between about 40 and 60 wt. percent water, between about 13 and 20 wt. percent asbestos fiber, between about 8 and 15 wt. percent pulverized oyster shell or mica, between about 0.1 and 1.5 wt. percent alkali metal salt of Vinsol resin, between about 0.05 and 0.35 wt. percent of an alkali metal hydroxide, between about 0.25 and 1.0 wt. percent alkali metal carboxy alkyl cellulose, and between about 0.3 and 3.0 wt. percent phosphate selected from the group consisting of monoammonium phosphate and diammonium phosphate.

The asphaltic emulsions of the invention may be prepared by mixing hot (e.g. 225–275° F.) asphalt with a warm (e.g. 130–160 F.) aqueous solution of saponified Vinsol resin to form an emulsion having an asphalt to water phase weight ratio between about 2:3 and 3:2, blending the emulsion with additional water, alkali metal hydroxide and the fire resistant additive (phosphate and cellulose), and then stirring in the asbestos and oyster shell (or mica) fillers to form the final emulsion. If desired, during the preparation of the emulsion any standard antifoamant may be employed in an amount between 5 and 20 p.p.m. based on the final emulsion. Examples of antifoamants which may be utilized are polymerized dimethyl siloxane of a molecular weight of 200 and polymerized methyl phenyl siloxane of a molecular weight of 300.

The asphalt ingredient which may be employed in the composition of the invention can be any of the petroleum and native asphalts, blown petroleum asphalts, steamed stilled asphalts and sludge asphalts. Of these materials petroleum asphalts is most advantageously employed and it may be produced by steam reduction, air blowing or solvent extraction methods or by a combination of such methods. We have further found that asphalts having a penetration between about 40 and 200 at 77° F. and a R. & B. (ring and ball) softening point of between about 100 and 150° F. are particularly suitable.

The emulsifier as heretofore stated is the combination of the alkali metal salt of Vinsol resin and alkali metal hydroxide. Examples of the emulsifier components contemplated herein are the sodium and potassium salts of Vinsol resin and sodium and potassium hydroxide. The combination of caustic and the sodium salt of Vinsol resin is a particularly suitable emulsifier.

It is to be noted that Vinsol resin is a solvent-extracted pinewood resin which is characterized by a solubility in alcohol, a methoxy content of about 3 to 7 wt. percent, a non-carboxylic hydroxyl content of 5 to 9 wt. percent, an acid number of about 85–105 and a softening point (R. & B.) of about 95–110° C. The alkali metal salts of Vinsol resin are prepared by reacting alkali metal hydroxides, carbonates or phosphates with Vinsol resin. Vinsol resin and saponified Vinsol resin are further described in U.S. Patents Nos. 2,114,393, 2,155,141, 2,193,026, 2,199,206, 2,256,886 and 2,412,526.

The ammonium phosphate additives contemplated herein are mono- and di-ammonium phosphates.

As to the alkali metal carboxy alkyl cellulose additive the alkyl group desirably has less than 5 carbons. Specific examples of the cellulose additive are sodium carboxy methyl cellulose and sodium carboxy ethyl cellulose.

In respect to the mineral filler ingredients, we contemplate asbestos fibers particularly asbestos fibers of which about 98 wt. percent pass a No. 12 sieve (U.S. Standard), not more than about 45 wt. percent pass a No. 40 sieve and not more than about 30 wt. percent pass a No. 200 sieve. The pulverized oyster shell or mica employed advantageously all pass a No. 40 sieve and at least about 55 wt. percent desirably pass a No. 200 sieve.

The following specific examples further serve to illustrate the invention, but are not to be interpreted as limitations thereof.

EXAMPLE I

This example illustrates the preparation of the bituminous emulsion of the type contemplated therein.

To 14.73 lbs. of water there was added 0.23 lb. of the sodium salt of Vinsol resin, 0.04 lb. of sodium hydroxide, and 15 p.p.m. of polymerized dimethyl siloxane (antifoamant) and the mixture was stirred at about 145° F. The resultant aqueous mixture and 15.0 lbs. of asphalt (heated to 250° F.) were passed through a colloid mill at about 155° F. The asphalt employed was a 50–50 blend of air-blown and vacuum reduced petroleum residua having an R. & B. softening point of 128° F. and a penetration between 50 and 60 at 77° F. To the resultant emulsion there was added an aqueous solution composed of 0.44 lb. monoammonium phosphate, 0.44 lb. sodium carboxy methyl cellulose, 0.10 lb. sodium hydroxide, and 34.27 lbs. water. To the resultant dispersion there was added with stirring 13.0 lbs. of asbestos fiber and 8.7 lbs. of pulverized oyster shell. The filled bituminous emulsion product was of the following composition.

drawal of the flame, the coated rod was again subjected to the flame for a similar additional length of time. If burning continued after the second application of the flame, the length of burning up to 300 seconds was recorded. The specimen was inspected for bleeding during the test. After cooling the coating was inspected for charring and removed so the wood rod could be inspected.

Bituminous emulsions contemplated by the invention and comparative bituminous emulsions similar to those of the invention were tested in the foregoing fire test procedure and the results are reported below in Table B:

*Table B*

| Ingredients | 8502–O | 8502–N | 8486–B | 8486–O | 8436–B | 8486–D | 8402–G | 8388–D |
|---|---|---|---|---|---|---|---|---|
| Asphalt | 17.25 | 17.25 | 17.25 | 17.70 | 17.50 | 17.25 | 18.75 | 10.86 |
| Water | 56.33 | 54.83 | 55.83 | 56.96 | 56.69 | 56.33 | 54.50 | 60.37 |
| Saponified Vinsol resin | 0.26 | 0.26 | 0.26 | 0.18 | 0.26 | 0.26 | 0.84 | 0.54 |
| Sodium hydroxide | 0.16 | 0.16 | 0.16 | 0.16 | 0.05 | 0.16 | 0.16 | 0.05 |
| Monoammonium phosphate | 0.50 | 2.0 | | | | | | |
| Diammonium phosphate | | | | 1.0 | | 1.0 | | |
| Disodium phosphate | | | | | 0.5 | | | 0.5 |
| Sodium tripolyphosphate | | | | | | | 0.75 | 0.18 |
| Sodium carboxy-methyl cellulose | 0.50 | 0.50 | 0.50 | 0.50 | | | | |
| Asbestos fiber [1] | 15 | 15 | 15 | 14 | 15 | 15 | 15 | 15 |
| Oyster shell [2] | 10 | 10 | 10 | 10 | 10 | 10 | 10 | |
| Mica [2] | | | | | | | | 12.5 |
| Fire Test—Flame duration: | | | | | | | | |
| After first 2 min. application, seconds | 0 | 0 | 0 | 0 | [3] 300+ | 0 | 0 | [3] 0 |
| Second 2 min. application, seconds | 0 | 0 | 0 | 180+ | | 180 | 55 | [3] 300+ |
| Bleeding of coating | None | None | None | Severe | Trace | Trace | None | Trace |
| Charring of coating | None | Slight | Slight | Moderate | Severe | Moderate | Slight | Severe |
| Charring of wood | None | Trace | Trace | Severe | | Moderate | Slight | Moderate |

[1] 98 wt. percent passing No. 12 sieve and 45 wt. percent max. passing No. 40 sieve and 30 wt. percent max. passing No. 200 sieve.
[2] 100 wt. percent passing No. 40 sieve and 55 wt. percent passing No. 200 sieve.
[3] 90 sec.

*Table A*

Ingredients: Weight percent
- Asphalt _____ 17.25
- Water _____ 56.33
- Sodium hydroxide _____ 0.16
- Saponified Vinsol resin _____ 0.26
- Monoammonium phosphate _____ 0.50
- Sodium carboxy methyl cellulose __ 0.50
- Asbestos fiber [1] _____ 15.00
- Pulverized oyster shell [2] _____ 10.00
- Anti-foamant, 5 p.p.m.

[1] 98 wt. percent passing No. 12 sieve; 45 wt. percent max. passing No. 40 sieve and 30 wt. percent max. passing No. 200 sieve.
[2] 100 wt. percent passing No. 40 sieve; 55 wt. percent passing No. 200 sieve.

EXAMPLE II

This example demonstrates the outstanding fire resistant properties of the bituminous emulsion of the invention when cured and its outstanding ability to protect wooden structures against fire.

The procedure employed to test the fire resistance of the bituminous emulsions was as follows:

An 8″ pine rod of 13/16″ diameter was coated with the bituminous emulsion to be tested to a thickness of 1/8″ to 1/4″ and the thus coated wooden rod was mounted in a horizontal position for 18 hours at room temperature, then cured for 24 hours in an oven at 180° F. The cured coated rod was allowed to cool before testing.

The cured coated pine rod was mounted on a rack and placed in a galvanized iron enclosure to minimize drafts. A can of Sterno (canned heat) was opened and placed directly under the test specimen half-way between the ends. The Sterno was ignited and the flame was allowed to burn for 2 minutes and then extinguished. If the specimen did not ignite during this period or did not continue to burn for more than 10 seconds after with- As can be seen from the above, the representative bituminous emulsions of the invention (8502–O, 8502–N and 8486–B) provide fire resistant coatings which do not burn even after being exposed to a flame for a four minute period and further provide coatings which after exposure do not bleed, char only slightly, and allow only a trace of charring of the coated wood. In contrast the remaining comparative compositions which delete or employ substitutes for one or both members of the phosphate-cellulose additive combination produce coatings which are not fire resistant, which tend to bleed and char upon exposure and which allow substantial damage to the wood surface.

We claim:

1. A fire resistant coating composition comprising between about 15 and 20 wt. percent asphalt of a penetration between about 40 and 200 at 77° F. and an R. & B. between about 100 and 150° F., between about 40 and 60 wt. percent water, between about 0.1 and 1.5 wt. percent alkali metal salt of Vinsol resin, between about 0.05 and 0.35 wt. percent alkali metal hydroxide, between about 13 and 20 wt. percent asbestos fiber, between about 8 and 15 wt. percent of a member selected from the group consisting of pulverized oyster shell and mica, between about 0.25 and 1 wt. percent alkali metal carboxy methyl cellulose and between about 0.3 and 3.0 wt. percent of a member selected from the group consisting of monoammonium phosphate and diammonium phosphate.

2. A composition in accordance with claim 1 wherein said alkali metal salt of Vinsol resin is sodium salt of Vinsol resin, said alkali metal hydroxide is sodium hydroxide, said member is oyster shell, and said alkali metal carboxy methyl cellulose is sodium carboxy methyl cellulose and said phosphate is monoammonium phosphate.

3. An article of manufacture comprising a wooden structure having a surface thereof coated with a fire resistant coating composition which upon initial application to said surface comprises between about 15 and 20 wt. percent asphalt of a penetration of between about 40 and 200 at 77° F., between about 40 and 60 wt. percent water, between about 0.1 and 1.5 wt. percent alkali metal salt of Vinsol resin, between about 0.05 and 0.35 wt. percent alkali metal hydroxide, between about 13 and 20 wt. percent asbestos fiber, between about 8 and 15 wt. percent of a member selected from the group consisting of oyster shell and mica, between about 0.25 and 1 wt. percent alkali metal carboxy methyl cellulose and between about 0.3 and 3 wt. percent of a phosphate selected from the group consisting of ammonium phosphate and diammonium phosphate.

4. An article of manufacture in accordance with claim 3 wherein said alkali metal salt of Vinsol resin is sodium salt of Vinsol resin, said alkali metal hydroxide is sodium hydroxide, said member is oyster shell, said alkali metal carboxy methyl cellulose is sodium carboxy methyl cellulose and said phosphate is monoammonium phosphate.

5. A fire resistant coating composition comprising between about 15 and 20 wt. percent asphalt, between about 40 and 60 wt. percent water, between about 0.1 and 1.5 wt. percent alkali metal salt of Vinsol resin, between about 0.05 and 0.35 wt. percent alkali metal hydroxide, between about 13 and 20 wt. percent asbestos fiber, between 8 and 15 wt. percent of a member selected from the group consisting of pulverized oyster shell and mica, between about 0.25 and 1 wt. percent alkali metal carboxyl alkyl cellulose and about 0.3 and 3.0 wt. percent of a member selected from the group consisting of monoammonium phosphate and diammonium phosphate.

References Cited by the Examiner
UNITED STATES PATENTS

| | | | |
|---|---|---|---|
| 2,733,159 | 1/1956 | Scoggin et al. | 106—282 |
| 2,939,794 | 6/1960 | Wilkinson | 106—15 |

OTHER REFERENCES

Dept. of Agriculture, "Fire Proofing Coating," Sept. 19, 1942.

ALEXANDER H. BRODMERKEL, *Primary Examiner.*

JOHN R. SPECK, *Examiner.*